US008402478B2

(12) United States Patent  (10) Patent No.: US 8,402,478 B2
Asai  (45) Date of Patent: Mar. 19, 2013

(54) STORING MEDIUM HAVING A DEVICE DRIVER FOR CONTROLLING A PLURALITY OF TYPES OF PERIPHERAL DEVICES

(75) Inventor: Daisuke Asai, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 724 days.

(21) Appl. No.: 12/551,896

(22) Filed: Sep. 1, 2009

(65) Prior Publication Data

US 2010/0058360 A1    Mar. 4, 2010

(30) Foreign Application Priority Data

Sep. 4, 2008  (JP) ................................. 2008-227469

(51) Int. Cl.
G06F 9/44       (2006.01)
G06F 9/46       (2006.01)
G06F 9/445      (2006.01)

(52) U.S. Cl. ......... 719/321; 719/327; 717/174; 717/175
(58) Field of Classification Search .......................... None
See application file for complete search history.

(56) References Cited

U.S. PATENT DOCUMENTS

| 2003/0131149 | A1 | 7/2003 | Sugiura |
| 2004/0085572 | A1* | 5/2004 | Gomez ........................ 358/1.15 |
| 2004/0205743 | A1 | 10/2004 | Sugahara |
| 2005/0108705 | A1 | 5/2005 | Koyama |
| 2006/0176499 | A1 | 8/2006 | Shintoku |

FOREIGN PATENT DOCUMENTS

| JP | 2001-236298 | 8/2001 |
| JP | 2003-058332 | 2/2003 |
| JP | 2003-099220 | 4/2003 |
| JP | 2003-202987 | 7/2003 |
| JP | 2005-141367 | 6/2005 |
| JP | 2006-221444 | 8/2006 |
| JP | 2007-011704 | 1/2007 |

OTHER PUBLICATIONS

"Microsoft Computer Dictionary", Microsoft Press, Fifth Edition, p. 499.*
"Microsoft Computer Dictionary", 2002, Microsoft Press, Fifth Edition, p. 499.*
Japanese Official Action dated Apr. 5, 2011 together with a partial English language translation from JP 2008-227469.
Japanese Office Action with English-language translation dated Aug. 3, 2010.

* cited by examiner

*Primary Examiner* — Qing Wu
(74) *Attorney, Agent, or Firm* — Scully, Scott, Murphy & Presser, PC

(57) ABSTRACT

A storing medium includes a driver program installable on a host computer and a plurality of files. The host computer includes a controller, and is connectable to a plurality of different types of peripheral devices. Each file includes separately a common setting file and an individual setting file. The common setting file includes common setting information that is commonly applicable to at least two types of peripheral devices. The individual setting file includes individual setting information that is unique to a single type of peripheral device. The driver program instructs the controller to select target setting information for controlling one peripheral device from the common setting information and the individual setting information included in the file corresponding to the one peripheral device, and to control the peripheral device based on the selected target setting information.

11 Claims, 9 Drawing Sheets

FIG.3

FileA.txt  ~9b

[PaperSize_Size]
A4=210.000,297.000
Letter=215.900,279.400       } 31
Legal=215.900,355.600
A5=148.000,210.000
Hagaki=100.000,148.000

[PaperSize_Image]
A4=6.01133,4.23333,203.989,292.767
Letter=6.35000,4.23333,209.550,275.167
Legal=6.35000,4.23333,209.550,351.367   } 32
A5=6.01133,4.23333,141.989,205.767
Hagaki=6.01133,4.23333,93.9887,143.767

[PaperSize_Command]
A4=¥x1b&l26a6d1E
Letter=¥x1b&l2a6d1E
Legal=¥x1b&l3a6d1E       } 33
A5=¥x1b&l25a6d1E
Hagaki=¥x1b&l71a6d1E

[InputSlot_Command]
Auto=¥x1b&l7H
Tray1=¥x1b&l1h1001H      } 34
Tray2=¥x1b&l5h1001H
Manual=¥x1b&l2H

```
                                                    9a
FileB.txt
  [General]
  SettingFile=FileA.txt ——16

[DriverInfo]
  PrintRateA4=30      ⎫
                      ⎬ 35
  PrintRateLetter=32  ⎭
  PaperWidth=69.9,215.9  ⎫ 36
  PaperHeight=116,406.4  ⎭
  SleepTime=1,240 ——37

[Default]
  PaperSize=Letter  ⎫ 38
  InputSlot=Auto    ⎭

[Capability]
  InputSlot=Auto,Tray1,Tray2,Manual ——39
  PaperSize=A4,Letter,Legal,A5 ——40

[InputSlot_Command]
  Auto=¥x1b&l8H ——34
           ⋮
```

FIG.5(a)

```
FileC_1.txt                                    ~ 8a
┌─────────────────────────────────────────────┐
│ [General]                                   │
│ SettingFile=FileB.txt  ~ 16                 │
│                                             │
│ [DriverInfo]                                │
│ DriverName=HL-***1 series  ~ 41             │
│ Duplex=Supported  ~ 42                      │
│ Macro=Supported  ~ 43                       │
│            .                                │
│            .                                │
│            .                                │
└─────────────────────────────────────────────┘
```

FIG.5(b)

```
FileC_2.txt                                    ~ 8b
┌─────────────────────────────────────────────┐
│ [General]                                   │
│ SettingFile=FileB.txt  ~ 16                 │
│                                             │
│ [DriverInfo]                                │
│ DriverName=HL-***2 series  ~ 41             │
│ Duplex=Unsupported  ~ 42                    │
│ Macro=Supported  ~ 43                       │
│                                             │
│ [Default]                                   │
│ PaperSize=A4  ~ 38                          │
│                                             │
│ [Capability]                                │
│ PaperSize=A4,Letter,Legal,A5,Hagaki  ~ 40   │
│                                             │
│ [PaperSize_Size]                            │
│ A4=297.000, 210.000  ~ 44                   │
│            .                                │
│            .                                │
│            .                                │
└─────────────────────────────────────────────┘
```

[DriverInfo]
DriverName=FileC_2.txt ～ 41
Duplex=FileC_2.txt ～ 42
Macro=FileC_2.txt ～ 43

[Default]
PaperSize=FileC_2.txt ⎫
InputSlot=FileB.txt ⎬ 38

[InputSlot_Command]
Auto=FileB.txt ⎫
Tray1=FileA.txt ⎬ 34
Tray2=FileA.txt ⎪
Manual=FileA.txt ⎭
.
.
.

[DriverInfo]
DriverName=HL-***2 series
Duplex=Unsupported
Macro=Supported

[Default]
PaperSize=A4
InputSlot=Auto

[InputSlot_Command]
Auto=¥x1b&l8H
Tray1=¥x1b&l1h1001H
Tray2=¥x1b&l5h1001H
Manual=¥x1b&l2H
.
.
.

[FileList]
FileNumber=3
File1=FileC_2.txt
File2=FileB.txt
File3=FileA.txt
.
.
.

STORING MEDIUM HAVING A DEVICE DRIVER FOR CONTROLLING A PLURALITY OF TYPES OF PERIPHERAL DEVICES

CROSS REFERENCE TO RELATED APPLICATION

This application claims priority from Japanese Patent Application No. 2008-227469 filed Sep. 4, 2008. The entire content of this priority application is incorporated herein by reference.

TECHNICAL FIELD

The present invention relates to a storing medium and a computer-readable storage medium storing a set of driver program instructions.

BACKGROUND

An installer well known in the art is typically distributed to users on a distributable disc, such as a CD-ROM, or via the Internet. The installer includes a device driver (hereinafter simply referred to as "driver") that is prepared for each of a plurality of printer models, and an installation program that installs the driver on the user's computer.

A device driver, such as that disclosed in Japanese unexamined patent application publication No. 2003-202987, includes not only various common driver programs, but also device setting information expressing settings required for printing operations and a user-computer interface.

The device setting information covers support data indicating a range of possible printing functions (such as the availability of duplex printing), command data for transferring user instructions regarding paper size and the like to the printer, default data specifying initial settings for printing operations such as the printing region, and the like.

SUMMARY

However, the provider of device drivers such as the manufacturer of a plurality of printer models (hereinafter referred to as the "driver provider") ordinarily prepares one set of device setting information for each printer model when developing an installer (prior to distributing the installer to users) and rewrites the device setting information prepared for a printer model when specifications of the printer model have been modified e.g., when new printer functions have been added or commands modified.

Accordingly, even when the modified specifications are shared among (or common to) a plurality of printer models, the driver provider must review the device setting information for all relevant models, requiring much work related to operations for modifying specifications and managing files storing the device setting information. When there are numerous files of device setting information that must be rewritten, there is a greater concern of error occurring when specifications are modified.

In view of the foregoing, it is an object of the present invention to provide a storing medium and a computer-readable storage medium storing a set of driver program instructions capable of easily reflecting specification changes.

In order to attain the above and other objects, a storing medium including a driver program installable on a host computer and a plurality of files. The host computer includes a controller, and is connectable to a plurality of different types of peripheral devices. Each file includes separately a common setting file and an individual setting file. The common setting file includes common setting information that is commonly applicable to at least two types of peripheral devices. The individual setting file includes individual setting information that is unique to a single type of peripheral device. The driver program instructs the controller to select target setting information for controlling one peripheral device from the common setting information and the individual setting information included in the file corresponding to the one peripheral device, and to control the peripheral device based on the selected target setting information.

According to another aspect, the present invention provides a storing medium including a driver program installable on a host computer and a plurality of files. The host computer includes a controller and a user interface, and is connectable to a plurality of different types of peripheral devices. Each file includes separately a common setting file and an individual setting file. The common setting file includes common UI setting information that is commonly applicable to at least two types of peripheral devices. The individual setting file includes individual UI setting information that is unique to a single type of peripheral device. The driver program inducts the controller to select target setting information for controlling one peripheral device from the common UI setting information and the individual UI setting information, and to control the user interface based on the selected target setting information.

According to another aspect, the present invention provides a computer-readable storage medium storing a set of driver program instructions executable on a host computer connectable to a plurality different types of peripheral devices. The program instructions includes selecting target setting information for controlling one peripheral device from common setting information that is commonly applicable to at least two types of peripheral devices from a common setting file, and individual setting information that is unique to a single type of peripheral devices from an individual setting file, both the common setting information and the individual setting information being included in the file corresponding to the one peripheral device; and controlling, based on the selected target setting information, the device under an aegis of the host computer.

BRIEF DESCRIPTION OF THE DRAWINGS

The particular features and advantages of the invention as well as other objects will become apparent from the following description taken in connection with the accompanying drawings, in which:

FIG. 3 shows setting information included in a major classification file;

FIG. 4 shows setting information included in a minor classification file;

FIG. 5(a) shows setting information included in a first individual file;

FIG. 5(b) shows setting information included in a second individual file;

FIG. 8(a) shows a file list according to a second embodiment;

FIGS. 8(b) and 8(c) show file lists according to variations of embodiments; and

DETAILED DESCRIPTION

Next, preferred embodiments of the present invention will be described while referring to the accompanying drawings.

[First Embodiment]

[Overall Structure of the Print Control System]

Figure 1:
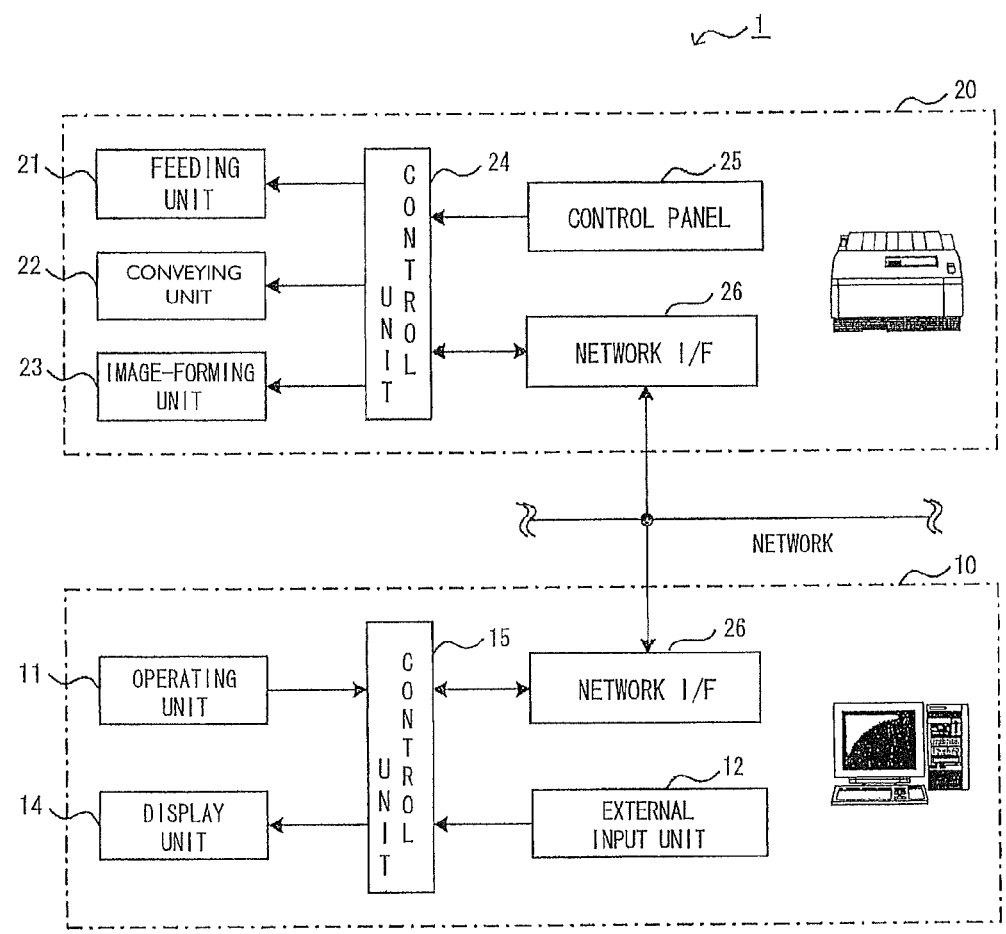
FIG. 1 is a block diagram showing an overall structure of a print control system 1 provided with a device driver according to a first embodiment of the present invention.

As shown in FIG. 1, the print control system 1 includes a personal computer (hereinafter referred to as "PC") 10 functioning as a host device, and a printer 20 functioning as a peripheral device to the PC 10. The PC 10 and printer 20 are connected via a LAN or other network.

The printer 20 is a device well known in the art that includes a feeding unit 21 for supplying various types of paper or other printing media loaded in a paper cassette or a manual feed tray (not shown), a conveying unit 22 for conveying sheets of paper fed by the feeding unit 21, an image-forming unit 23 for printing images on the printing medium conveyed by the conveying unit 22, and a control unit 24 for driving each of the units 21-23.

The control unit 24 includes a CPU, ROM, RAM, hard disk drive (HDD); a bus line connecting each of these components; and the like. The control unit 24 is also connected to an control panel 25 having various cursor key and switches by which the user can input settings, commands, and the like, a menu screen for displaying various menu options, data inputted by the user, error messages, and the like; a network interface 26 for inputting image data received from the PC 10 or other host device via the network; and the like. The control unit 24 controls how the feeding unit 21, conveying unit 22, and image-forming unit 23 are driven to implement various printing functions based on commands inputted via the control panel 25 or the network interface 26.

The PC 10, on the other hand, includes an operating unit 11, such as a mouse or keyboard on which the user can input data required for operating the PC 10; an external input unit 12 for inputting data and the like stored on a CD-ROM or other storage medium into the PC 10; a network interface 13 for inputting and outputting data or commands via a network; a display unit 14 for displaying various data; and a control unit 15 for controlling the network interface 13 and display unit 14 based on data inputted from the units 11-13.

The display unit 14 is a liquid crystal display or other well known display device and displays a user interface (UI) window on which a user can input various data, a mouse pointer, and other images through a well known function possessed by personal computers called a graphical user interface (GUI).

The control unit 15 is configured primarily of a microcomputer well known in the art that includes a CPU, RAM, ROM, HDD, a bus line connecting these components, and the like. The CPU performs processes based on various programs stored on the ROM or HDD for implementing an operating system (OS) and application functions well known in the art, printing functions of the printer 20, and the like.

The OS has a multitasking function and is installed in the ROM of the control unit 15. Application programs for creating document data, processing image data, and the like, and a device driver 6 (described later) for implementing printing processes operate under the OS platform in the control unit 15.

[Installer, Device Driver, and Device Driver Program]

Figure 2:
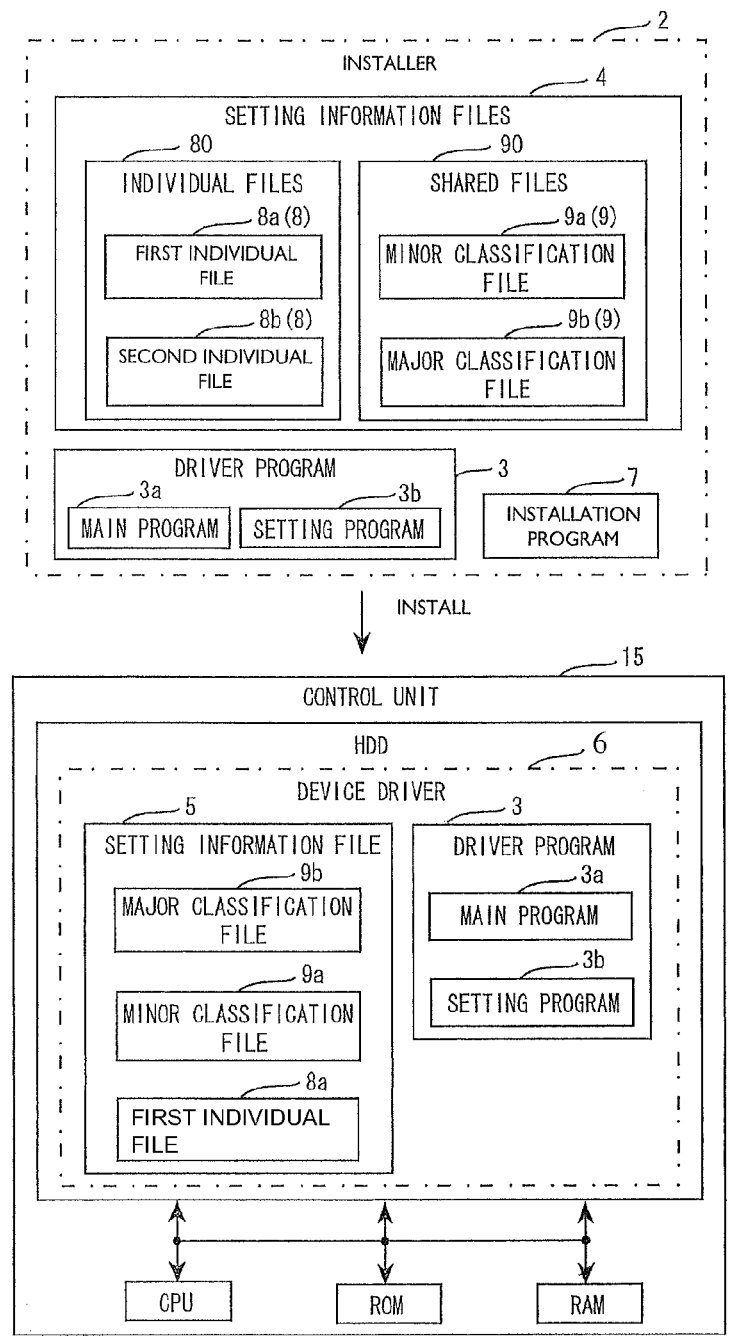
FIG. 2 is a block diagram illustrating a structure of an installer, device driver, and device driver program according to the first embodiment.

As shown in FIG. 2, an installer 2 is provided with a device driver program 3 compatible with the OS of the PC 10, a set of setting information files 4 storing setting information for a plurality of models required to control devices such as the printer 20, and an installation program 7 for installing the device driver 6 on a host device such as the PC 10. The device driver 6 is configured of setting information files 5 including setting information from the set of setting information files 4 that corresponds to the printer 20, and the device driver program 3.

The setting information in the preferred embodiment represents setting categories and values (or data) set for these categories that are required by the UI in order to perform printing operations on the printer 20 and printing processes on the PC 10 or other host device. The setting information is managed by the provider of the device driver 6 such as the manufacturer of the printer 20 or the like (hereinafter referred to as the "driver provider").

The driver provider also distributes the installer 2 on a single distributable storage medium, such as a CD-ROM, or from a server connected to the Internet. In the preferred embodiment, the installer 2 is loaded into the PC 10 via the external input unit 12 or the network interface 13.

The set of setting information files 4 includes an individual file set 80 including a plurality of files storing setting information associated with individual models (types) of the printer 20 (hereinafter referred to as "individual files 8"), and a shared (common) file set 90 including a plurality of files storing setting information corresponding to a series of models (hereinafter referred to as "shared files 9"). Here, a series is a group that includes a plurality of models. The manufacturer must prepare new setting information for a device when major improvements are made in the functions that the device can implement or when major changes are made in the design of the device when compared to other products in a series. Accordingly, the series for the printer 20 includes other printers having relatively similar functions and a relatively similar design. For example, a plurality of printers having a common function or operated with a common command belongs to one series.

The individual file set 80 is divided into a first individual file 8a supporting a domestic model of the printer 20, and a second individual file 8b supporting an overseas model of the printer 20. Note that the individual file set 80 may be divided into a plurality of files each having a different version from one another, for example. The shared file set 90 is also divided into a minor classification file 9a corresponding to a single series, and a major classification file 9b corresponding to all series.

As shown in FIG. 3, the major classification file 9b defines setting information for all series. The setting information includes values for each of the setting categories. In the preferred embodiment, the setting categories include a paper size 31 (e.g., A4, Letter, Legal, A5, Postcard, etc.), a printing region 32 for each paper size, a command 33 for each paper size, and a command 34 for each paper source.

As shown in FIG. 4, the minor classification file 9a describes setting information corresponding to a single series. This setting information includes values for each of the setting categories, the values being not included in the major classification file 9b. In the preferred embodiment, the setting categories include a printing rate 35 for each paper size, a printable region 36, a sleep time 37 for the power-saving mode, UI default settings 38, a paper source 39 (e.g., Auto, Tray 1, Tray 2, Manual, etc.), a printable paper size 40, and a file ID 16. In the preferred embodiment, some of the commands 34 for the paper sources are added to the minor classification file 9a as specifications for the series are modified. The file ID 16 functions to identify the next file to be referenced. The value for the file ID 16 in FIG. 4 is the data "File A," which is the filename of the major classification file 9b.

As shown in FIG. 5(a), the first individual file 8a stores setting information corresponding to the domestic model of the printer 20. This setting information includes values for the setting categories, the values being included in neither the major classification file 9b nor the minor classification file 9a In the preferred embodiment, the setting categories include a model number 41, a support indicator for duplex printing 42, a support indicator for printing macros 43, and the file ID 16.

As shown in FIG. 5(b), the second individual file 8b stores the same data as that described in the first individual file 8a and additionally includes some of the UI default settings 38, the printable paper sizes 40, and a printing orientation 44 for each paper size. The setting value for the file ID 16 in this case is the filename "File B" of the minor classification file 9a. Further, the model number 41 and support indicator for duplex printing 42 in the second individual file 8b are modified to the overseas values.

The CPU of the control unit 15 launches the installation program 7 when installing the device driver 6 on the PC 10 in the preferred embodiment. Based on the installation program 7, the CPU of the control unit 15 stores the major classification file 9b, minor classification file 9a, and, in the case of the domestic model, the first individual file 8a as the setting information files 5, as well as the device driver program 3, in a specific location (system folder, for example) of the HDD that the OS of the PC 10 manages via the UI. The setting information files 5 and the device driver program 3 stored on the HDD constitute the device driver 6.

The device driver program 3 includes a driver control module (hereinafter referred to as a "main program 3a") for outputting data and commands to devices such as the printer 20 and for controlling the UI on host devices such as the PC 10 (hereinafter referred to collectively as "print control"), and a setting information management module (hereinafter referred to as a "settings program 3b") for transferring setting information (values) required for print control to the main program 3a.

[Settings Program]

Figure 6A:
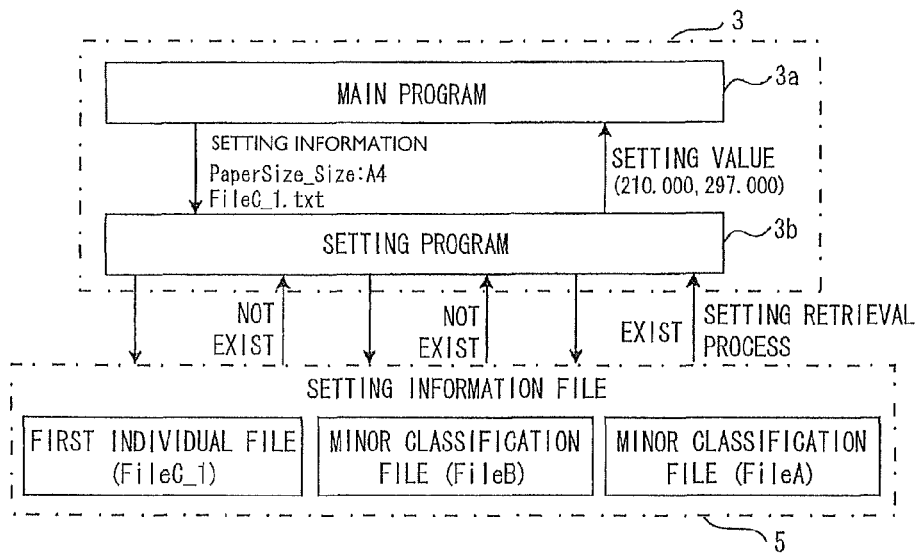
FIGS. 6(a) and 6(b) show setting operations by a setting program.
Figure 6B:
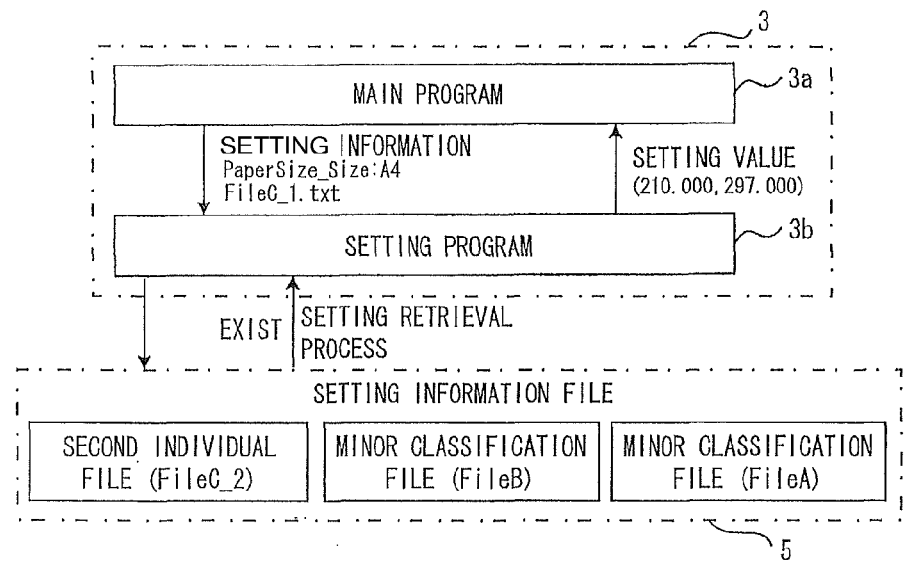

As shown in FIGS. 6(a) and 6(b), the settings program 3b according to the preferred embodiment receives a command from the main program 3a indicating a request (query) for setting information required for print control. Upon receiving such a command, the settings program 3b reads a setting value for the category specified in the command (hereinafter referred to as a "target category") from the setting information files 5 according to a setting retrieval process described below and transfers the retrieved setting value to the main program 3a.

[Setting Retrieval Process]

Figure 7:
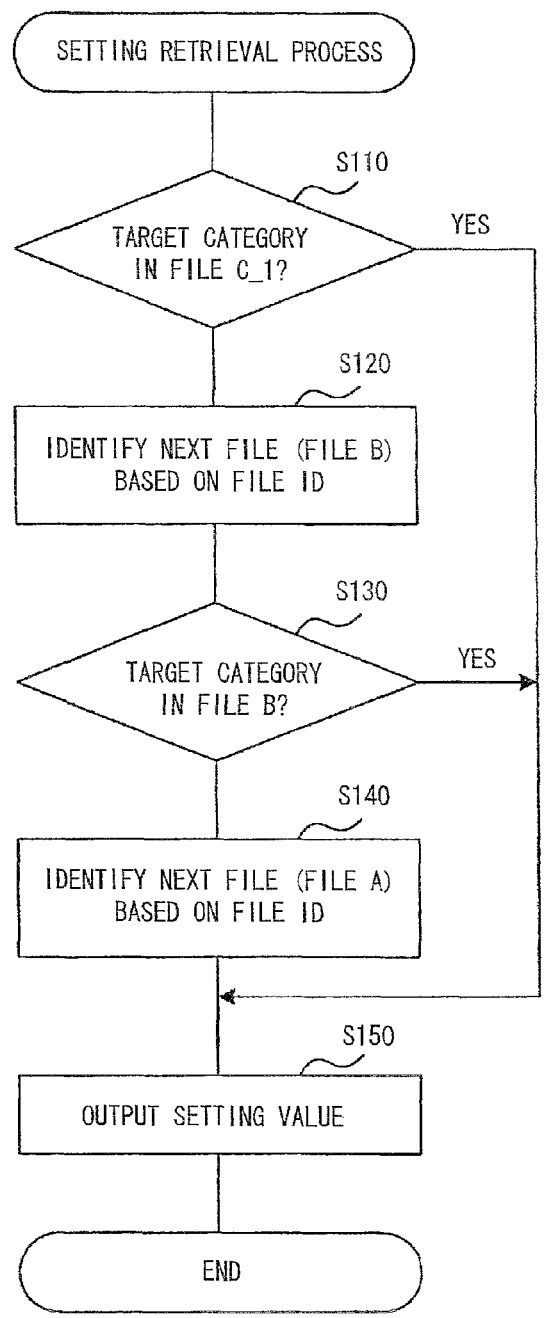
FIG. 7 is a flowchart illustrating steps in a setting retrieval process.

FIG. 7 is a flowchart illustrating steps in the setting retrieval process executed by the CPU of the control unit 15. The CPU of the control unit 15 executes this process based on the settings program 3b stored on the HDD when the device driver 6 is installed on the PC 10. This operation starts, for example, when a user pushes a printing button.

In S110 at the beginning of the process in FIG. 7, the CPU of the control unit 15 (hereinafter simply "CPU") references the first individual file 8a based on the command received from the main program 3a to determine whether the target category exists in the first individual file 8a (File C_1). The CPU initially references the first individual file 8a because the file is predetermined in the main program 3a for the domestic model.

If the target category exists in the first individual file 8a (S110: YES), the CPU advances to S150. However, if the target category does not exist in the first individual file 8a (S110: NO), in S120 the CPU identifies the next file to reference based on the file ID 16 stored in the first individual file 8a. Since the file ID 16 stored in the first individual file 8a is the minor classification file (File B) in the example of FIG. 6, in S130 the CPU references the minor classification file 9a to determine whether the target category exists therein.

If the target category does exist in the minor classification file 9a (S130: YES), the CPU advances to S150. However if the target category does not exist in the minor classification file 9a (S130: NO), in S140 the CPU identifies the next file to be referenced based on the file ID 16 recorded in the minor classification file 9a. Since the file ID 16 stored in the minor classification file 9a is the major classification file (File A) in the example of FIG. 6, the CPU next references the major classification file 9b. In other words, since the target category should exist in one of the files by design, then the target category should exist in File A when not in File C_1 or File B.

In S150 the CPU reads the setting value corresponding to the target category from the first individual file 8a after a positive determination in S110, from the minor classification file 9a after a positive determination in S130, or from the major classification file 9b identified in S140. The CPU also transfers this setting value to the man program 3a before ending the current process.

In the example shown in FIG. 6(a), the target category requested by the main program 3a is "PaperSize_Size: A4." The CPU begins searching for the target category from File C_1 shown in FIG. 5(a). Since the target category does not exist in File C_1 in this example, the CPU next searches File B shown in FIG. 4, which is listed as the next file to reference in File C_1. Since the target category also does not exist in File B, the CPU ultimately searches File A shown in FIG. 3. Here, the target category "PaperSize_Size: A4" exists in the group of paper sizes 31 in File A. Accordingly, the CPU outputs the value "210.000, 297.000" to the main program 3a.

FIG. 6(b), on the other hand, shows an example in which the major classification file 9b, minor classification file 9a, and second individual file 8b are stored in a specific location on the HDD when the target category requested by the main program 3a is "PaperSize_Size: A4." In this example, the CPU begins searching from the second individual file 8b (File C_2) shown in FIG. 5(b) based on the instruction from the main program 3a. Since the target category "PaperSize_Size: A4" does exist in File C_2, the CPU quickly outputs the value "297.000, 210.000" to the main program 3a.

As illustrated in these examples, the setting value that the CPU acquires in response to the target category requested by the main program 3a and outputs to the main program 3a can differ based on which files the CPU references and in what order the files are referenced.

The print control system 1 according to the preferred embodiment takes advantage of this point by managing all setting information not included in the shared file in an individual file. When a modification is made to setting information stored in a setting information file and the modification is common to a plurality of devices, the PC 10 according to the preferred embodiment can handle this modification by overwriting the shared file. Conversely, when a modification is made to specifications of only some models, the PC 10 can overwrite setting information related to these models only since the setting information is managed in individual files. Therefore, the setting information can easily be modified to reflect any type of specification change.

[Effects of the First Embodiment]

As described above, the device driver 6 according to the preferred embodiment is configured of the setting information files 5 comprising the major classification file 9b for all series, the minor classification file 9a for a single series, and an individual file 8 corresponding to a specific model; and the device driver program 3 that controls the printer 20 using the setting information described in the setting information files 5.

Accordingly, the driver provider can manage setting information other than that in the shared files 9 (the major classification file 9b and minor classification file 9a) in the individual files 8 (the first individual file 8a and second individual file 8b). When setting information described in the setting information files 5 is modified (specifications are changed), the driver provider can reflect these changes by overwriting (modifying, adding, or deleting) data only in the shared files 9 when the changes in specifications are common to a plurality of models. Hence, specification changes can be easily reflected with the device driver 6 according to the preferred embodiment.

Further, with the installer 2 according to the preferred embodiment, the installation program 7 installs the individual file 8 (the first individual file 8a or second individual file 8b) among the individual file set 80 corresponding to the model, together with the shared files 9 and the device driver program 3.

Hence, since the driver provider need not prepare an installer 2 for each model in the preferred embodiment, the provider can mass produce installers 2 corresponding to a plurality of models, reducing production costs.

Further, if the target category is included in both the shared file and the individual file, the setting value for the target category is acquired from the individual file. Hence, specification changes can be more easily reflected with the device driver 6 according to the preferred embodiment.

In the preferred embodiment described above, the setting information files 5 include three files, namely, the first individual file 8a, minor classification file 9a, and major classification file 9b, but the CPU of the control unit 15 references these three files in the order specified by the file ID 16 when performing the setting retrieval process of FIG. 7. However, the setting information files 5 may take on various forms and are not limited to the number and types of files described in the preferred embodiment. For example, the setting information files 5 may be configured of a single individual file from the individual file set 80, and a single shared file from the shared file set 90. In this case, the CPU retrieves the target category from one of these two files and outputs the corresponding value. Alternatively, the setting information files 5 may be configured of four or more files, in which case the CPU of the control unit 15 identifies the file to be referenced next in order based on the file ID 16 stored in each file.

[Second Embodiment]

Next, a device driver according to a second embodiment of the present invention will be described. The device driver 6 according to the second embodiment differs from that in the first embodiment in the structure of the settings program 3b. The following description will focus on this difference.

[Settings Program]

Upon receiving a command from the main program 3a expressing a request (inquiry) for setting information required for print control, the settings program 3b reads the setting value corresponding to the category indicated in the command from the setting information files 5 using a file list 17 described later and transfers this setting value to the main program 3a.

[Process for Creating a File List]

When the device driver program 3 is initially launched after the device driver 6 has been installed on the PC 10, the CPU of the control unit 15 executes a process based on the settings program 3b stored on the HDD to create the file list 17 (hereinafter referred to as the "file list creation process"). This file list creation process will be described next.

The CPU of the control unit 15 uses this file list 17 when performing processes related to print control based on the main program 3a stored on the HDD. The file list 17 is configured of setting categories required for print control on the PC 10 and printer 20, and filenames indicating the locations for acquiring (referencing) values corresponding to these categories (see FIG. 8(*a*)). The file list 17 is recorded in a prescribed region of the HDD (the registry, for example).

Figure 9:
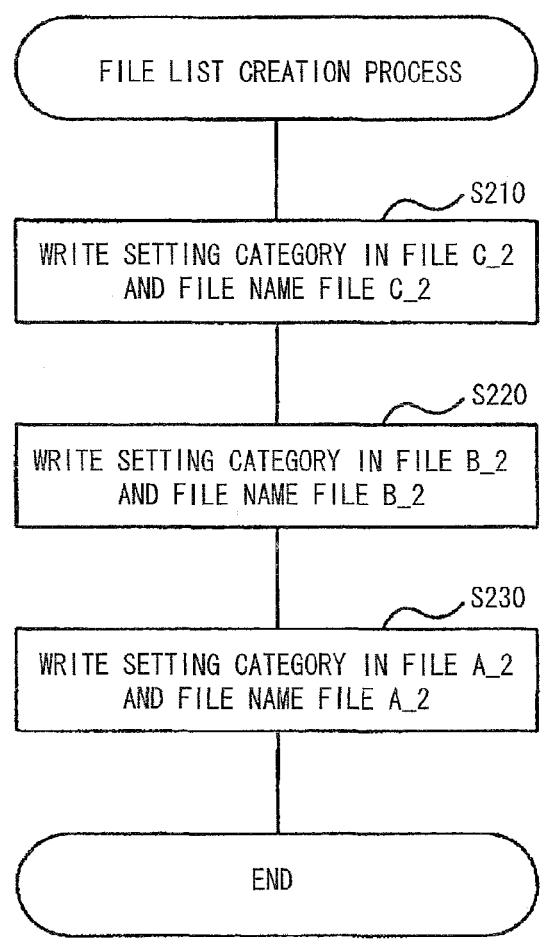
FIG. 9 is a flowchart illustrating steps in a file list creation process.

FIG. 9 is a flowchart illustrating steps in the file list creation process executed by the CPU of the control unit 15. In S210 at the beginning of the process shown in FIG. 9, the CPU references the filename of the first individual file 8a (File C_2) in the setting information files 5, reads all setting categories recorded in this file, and writes the setting categories and the filename of the first individual file 8a (File C_2) as the location of values for these categories to the file list 17. The CPU initially references the first individual file 8a (File C_2) based on a predefined setting in the main program 3a.

In the example shown in FIG. 8(*a*), the CPU writes the model number 41, support indicator for duplex printing 42, and support indicator for printing macros 43 as setting categories and "File C_2" as the location of values for these categories in the file list 17.

In S220 the CPU references the minor classification file 9a in the setting information files 5 since the file ID 16 recorded in the first individual file 8a is set to the name of the minor classification file (File B), and writes the setting categories recorded in the minor classification file 9a and the filename of the minor classification file 9a (File B) as the location for setting values corresponding to these categories in the file list 17. If any of these categories are the same as categories already written to the file list 17 in S210, the previously written setting values take precedence. For example, since "File C_2" was previously written in S210 as the location of the setting value for "PaperSize" in the setting categories of the UI default settings 38, the CPU does not overwrite this data with "File B," as illustrated in FIG. 8(*a*). However, the category "InputSlot" had not been recorded in the file list 17 by the completion of S210 and, thus, the CPU writes "File B" as the location for this setting.

In S230 the CPU references the major classification file 9b in the setting information files 5 since the file ID 16 recorded in the minor classification file 9a is set to the name of the major classification file (File A), writes the setting categories described in the major classification file 9b and the filename of the major classification file 9b (File A) as the location of setting values for these categories to the file list 17, and subsequently ends the file list creation process. As described in S220, previously written data takes precedence when the major classification file 9b has the same setting categories as those in previous files. Thus, only setting categories that were not previously written to the file list 17 are added at this time. For example, the category "Auto" under the commands 34 and the location "File B" for acquiring the value for this category were previously written to the file list 17 in S220. Accordingly, the setting value in File B takes precedence for the category "Auto," while the data "File A" is written for the other categories "Tray 1," "Tray 2," and "Manual" of the commands 34.

Hence, in this process the CPU Antes all setting categories in the setting information files 5 and filenames indicating the locations of values for these categories without omission. Further, when the setting information files 5 include redundant setting categories, the CPU adheres to an order of priority for specifying setting value locations when creating the file list 17. In this example, the order of priority is the first individual file 8a, the minor classification file 9a, and the major classification file 9b.

The CPU can use this file list 17 when the main program 3a requests a target category. For example, if the device driver program 3 requests the target category "Default: PaperSize," by referencing the file list 17 shown in FIG. 8(a), the CPU finds that File C_2 is written next to "PaperSize" in the UI default settings 38 as the location of the setting value. Accordingly, the CPU outputs "PaperSize=A4" to the main program 3a based on the content of File C_2 shown in FIG. 5(a).

[Effects of the Second Embodiment]

As described above, when initially launched after installation, the device driver program 3 according to the preferred embodiment creates a file list 17 listing setting categories that the main program 3a requires for print control, and destinations for acquiring (referencing) setting values for these categories.

Hence, when executing print control according to the main program 3a, the CPU can simply acquire setting values via the settings program 3b from the acquisition locations uniquely identified by the file list 17 (i.e., locations within the setting information files 5, and specifically among the first individual file 8a, minor classification file 9a, and major classification file 9b), thereby reducing the length of the print control process.

[Variations of the Embodiments]

While the invention has been described in detail with reference to specific embodiments thereof, it would be apparent to those skilled in the art that many modifications and variations may be made therein without departing from the spirit of the invention, the scope of which is defined by the attached claims.

For example, the CPU of the control unit 15 executes the file list creation process according to the preferred embodiment the first time that the device driver program 3 is launched after the device driver 6 has been installed on the PC 10. However, the CPU of the control unit 15 may execute this process when the device driver 6 is installed or first used, or at another time, provided that the process is executed at least before print control is performed.

The file list 17 according to the preferred embodiment is configured of setting categories required for print control by the main program 3a, and locations for acquiring (referencing) their corresponding setting values, but the present invention is not limited to this content. For example, the CPU of the control unit 15 may create a file list having filenames to be referenced by the main program 3a, and their reference priority based on the file ID 16 recorded in each file in the setting information files 5, as illustrated in FIG. 8). Alternatively, the CPU may create a setting value list such as that illustrated in FIG. 8(c) by acquiring setting categories and values necessary for print control with the main program 3a from the appropriate files in advance.

In this case, the settings program 3b need not reference the setting information files 5 each time print control is performed, thereby reducing the load on the PC 10 when executing the device driver program 3.

Further, the installer 2 according to the preferred embodiment is configured to install the individual file 8 from the individual file set 80 that corresponds to the relevant model, but the installer 2 may alternatively be configured to install the minor classification file 9a from the shared file set 90 that corresponds to the relevant series. Further, the numbers of files included in the individual file set 80 and the shared file set 90 are not limited to the numbers in the preferred embodiments.

Further, the device driver 6 according to the preferred embodiments described above is executed on the PC 10 for controlling the printer 20, but the device driver 6 may be executed on a host device other than the PC 10 and may function to control a device other than the printer 20. Further, the PC may be integrated in the printer. The Installer and the device program may be installed on the PC separately.

What is claimed is:

1. A storing medium comprising:
a driver program installable on a host computer including a controller, the host computer being connectable to a plurality of different types of peripheral devices; and
a plurality of files, each file including separately a common setting file and an individual setting file, the common setting file including common setting information that is commonly applicable to at least two types of peripheral devices, the individual setting file including individual setting information that is unique to a single type of peripheral device,
wherein the driver program instructs the controller to select target setting information for controlling one peripheral device from the common setting information and the individual setting information included in a file of the plurality of files corresponding to the one peripheral device, and to control the peripheral device based on the selected target setting information;
wherein the target setting information includes a target setting category and a target setting value of the target setting category, and
wherein if the target setting category is included in both the common setting file and the individual setting file, the driver program instructs the controller to select the target setting value for the target setting category from the individual setting file, and to control the peripheral device based on the selected target setting value.

2. The storing medium according to claim 1, wherein the common setting file includes a major classification file for a first type of peripheral devices, and a minor classification file for a second type of peripheral devices, the number of the second type of peripheral devices being smaller than the number of the first type of peripheral devices, and
wherein if the target setting category is included in both the minor classification file and the major classification file, the driver program instructs the controller to select the target setting value for the target setting category from the minor classification file, and to control the peripheral device based on the selected target setting value.

3. The storing medium according to claim 1, wherein the target setting information includes a target setting category and a target setting value for the target setting category, and
wherein the driver program instructs the controller to sequentially determine whether or not each of the plurality of files includes the target setting category, and to select the target setting value for the target setting category from the file that has been firstly determined to include the target setting category.

4. The storing medium according to claim 1, wherein the target setting information includes a target setting category and a target setting value for the target setting category,
wherein the common setting file includes a major classification file for a first type of peripheral devices, and a minor classification file for a second type of peripheral devices, the number of the second type of peripheral devices being smaller than the number of the first type peripheral devices, and
wherein the driver program instructs the controller to determine whether or not the plurality of files includes the target setting category in an order of the individual setting file, the minor classification file, and the major classification file.

5. The storing medium according to claim 1, wherein the target setting information includes a target setting category and a target setting value for the target setting category,
wherein each file includes a next file name that identifies one of the plurality of files,
wherein the driver program instructs the controller to determine whether or not one of the plurality of files includes the target setting category, and
wherein if one of the plurality of files does not include the target setting category, the driver program instructs the controller to determine whether or not the file identified by the next file name includes the target setting category.

6. The storing medium according to claim 1, wherein the target setting information includes a target setting category and a target setting value for the target setting category, and
wherein the driver program instructs the controller to create a list indicating a relationship between the target setting category and the file including the target setting category.

7. The storing medium according to claim 6, wherein the driver program instructs the controller to create the list, before instructing the controller to control the peripheral device.

8. The storing medium according to claim 6, wherein the file list further indicates the target setting category and a file name identifying a file having the target setting category.

9. The storing medium according to claim 1, wherein the target setting information includes a target setting category and a target setting value for the target setting category, and
wherein the driver program instructs the controller to acquire the target setting value for the target setting category from the file, and to create a list indicating a relationship between the acquired target setting value and the target setting category for the acquired target setting value.

10. A storing medium comprising:
a driver program installable on a host computer including a controller and a user interface, the host computer being connectable to a plurality of different types of peripheral devices; and
a plurality of files, each file including separately a common setting file and an individual setting file, the common setting file including common UI setting information that is commonly applicable to at least two types of peripheral devices, the individual setting file including individual UI setting information that is unique to a single type of peripheral device,
wherein the driver program instructs the controller to select target setting information for controlling one peripheral device from the common UI setting information and the individual UI setting information included in a file of the plurality of files corresponding to the one peripheral device, and to control the user interface based on the selected target setting information;
wherein the target setting information includes a target setting category and a target setting value of the target setting category, and
wherein if the target setting category is included in both the common setting file and the individual setting file, the driver program instructs the controller to select the target setting value for the target setting category from the individual setting file and to control the peripheral device based on the selected target setting value.

11. A computer-readable storage medium storing a set of driver program instructions executable on a host computer connectable to a plurality different types of peripheral devices, the program instructions comprising:
selecting target setting information for controlling one peripheral device from common setting information that is commonly applicable to at least two types of peripheral devices from a common setting file, and individual setting information that is unique to a single type of peripheral device from an individual setting file, both the common setting information and the individual setting information being included in a file corresponding to the one peripheral device; and
controlling, based on the selected target setting information, the device under an aegis of the host computer;
wherein the target setting information includes a target setting category and a target setting value for the target setting category,
the program instructions further comprising:
selecting the target setting value for the target setting category from the individual setting file, if the target setting category is included in both the common setting file and the individual setting file; and
controlling the device based on the selected target setting value.

* * * * *